United States Patent
Prazan et al.

(10) Patent No.: US 9,806,748 B2
(45) Date of Patent: Oct. 31, 2017

(54) TRANSPONDER WITH RECEIVING MEANS HAVING A LOW ELECTRICAL CONSUMPTION IN A LISTENING MODE

(71) Applicants: EM Microelectronic-Marin SA, Marin (CH); SMARTRAC TECHNOLOGY Wehnrath GmbH, Reichshof-Wehnrath (DE)

(72) Inventors: Michal Prazan, Prague (CZ); Michal Prokes, Jesenice (CZ); Jürgen Fehle, Ins (CH); Ulrich Friedrich, Ellhofen (DE)

(73) Assignees: EM Microeclectronic-Marin SA, Marin (CH); SMARTRAC TECHNOLOGY Wehnrath GmbH, Reichshof-Wehnrath (DE)

( * ) Notice: Subject to any disclaimer, the term of this patent is extended or adjusted under 35 U.S.C. 154(b) by 491 days.

(21) Appl. No.: 13/649,736

(22) Filed: Oct. 11, 2012

(65) Prior Publication Data
US 2013/0095780 A1  Apr. 18, 2013

(30) Foreign Application Priority Data
Oct. 13, 2011 (EP) .................................. 11184988

(51) Int. Cl.
  *H04B 1/16* (2006.01)
  *G06K 19/07* (2006.01)
  *H04W 52/02* (2009.01)

(52) U.S. Cl.
  CPC ....... *H04B 1/1615* (2013.01); *G06K 19/0726* (2013.01); *H04W 52/0229* (2013.01);
  (Continued)

(58) Field of Classification Search
  CPC combination set(s) only.
  See application file for complete search history.

(56) References Cited

U.S. PATENT DOCUMENTS 5,245,346 A  *  9/1993  Nishimura et al. ............. 342/42
7,019,645 B2      3/2006  Sacksteder
(Continued)

FOREIGN PATENT DOCUMENTS

| EP | 0 766 215 A1 | 4/1997 |
| WO | 2007/012065 A2 | 1/2007 |
| WO | 2009/143099 A1 | 11/2009 |

OTHER PUBLICATIONS

European Search Report issued in corresponding application EP 11 118 4988, completed Mar. 16, 2012.

*Primary Examiner* — Junpeng Chen
(74) *Attorney, Agent, or Firm* — Oblon, McClelland, Maier & Neustadt, L.L.P.

(57) ABSTRACT

The transponder comprises an antenna and a receiver circuit (2) for receiving RF signals, this receiver circuit is implemented with a control mechanism to activate it at least periodically in a listening mode. This receiver circuit is comprises a decoding circuit (4), formed at least by a demodulator (8) and a decoder (10), and a wake-up circuit (14B) to analyze received RF signals in the listening mode and arranged for controlling the activation of the decoding circuit in this listening mode. The wake-up circuit comprises a frequency discriminator (17) and a digital modulation or preamble detector (18) downstream from a field clock generator (28). The wake-up circuit receives as entry an alternating signal branched from the signal chain through the receiver circuit upstream from the demodulator and it activates the decoding circuit only when a modulation or a preamble is detected in a received RF signal by the digital modulation or preamble detector.

24 Claims, 8 Drawing Sheets

(52) U.S. Cl.
CPC ...... *H04W 52/0238* (2013.01); *H04W 52/028* (2013.01); *Y02B 60/50* (2013.01)

(56) References Cited

U.S. PATENT DOCUMENTS

| | | | |
|---|---|---|---|
| 2007/0109099 A1* | 5/2007 | Raphaeli et al. | ............ 340/10.2 |
| 2009/0256674 A1* | 10/2009 | Lee et al. | ........................ 340/5.6 |
| 2010/0245153 A1 | 9/2010 | Kuratli | |
| 2011/0158303 A1* | 6/2011 | Gauthier | ........... H04W 52/0283 375/224 |
| 2011/0289123 A1* | 11/2011 | Denison | ................ G07F 11/002 707/812 |

* cited by examiner

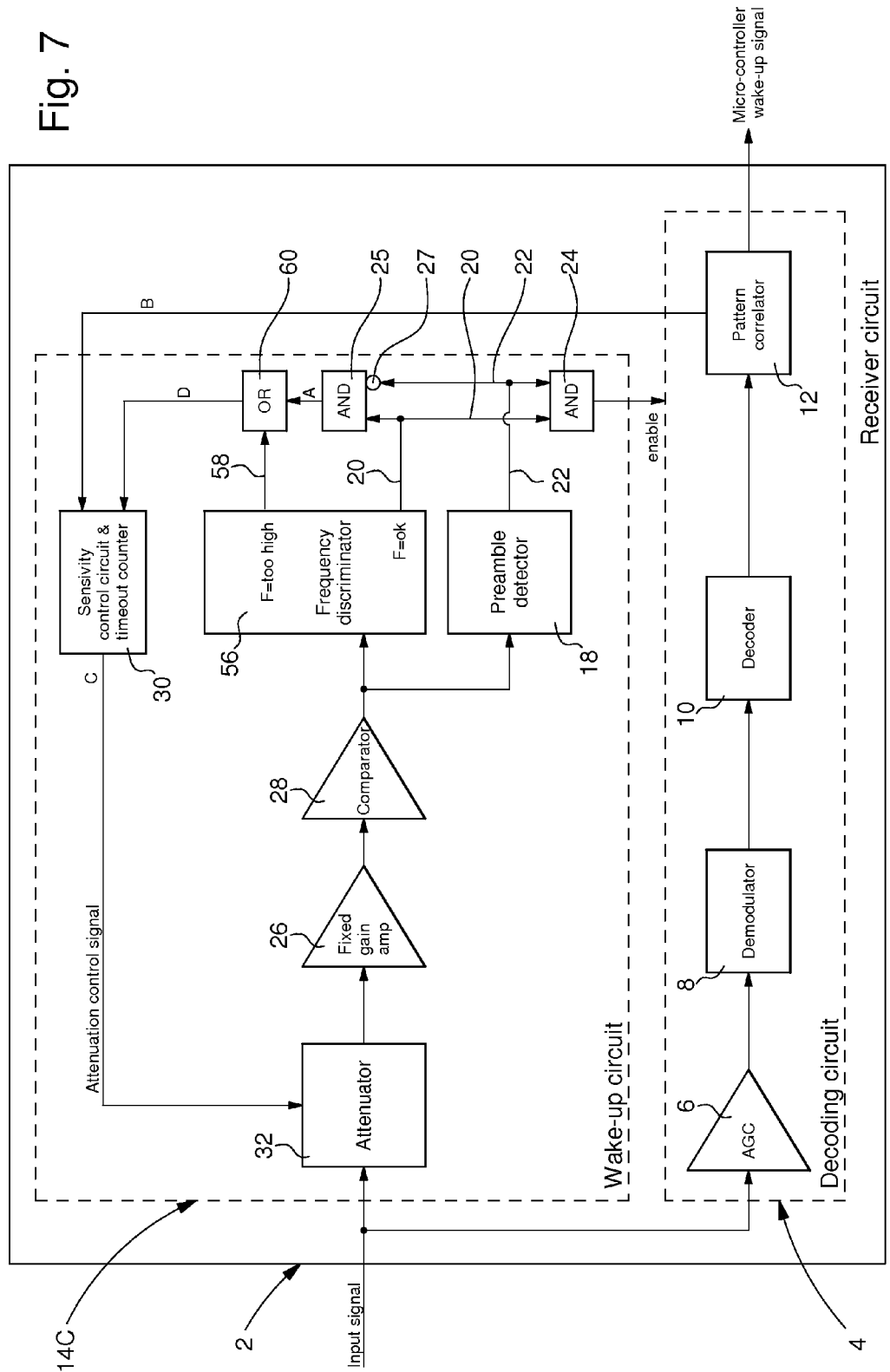

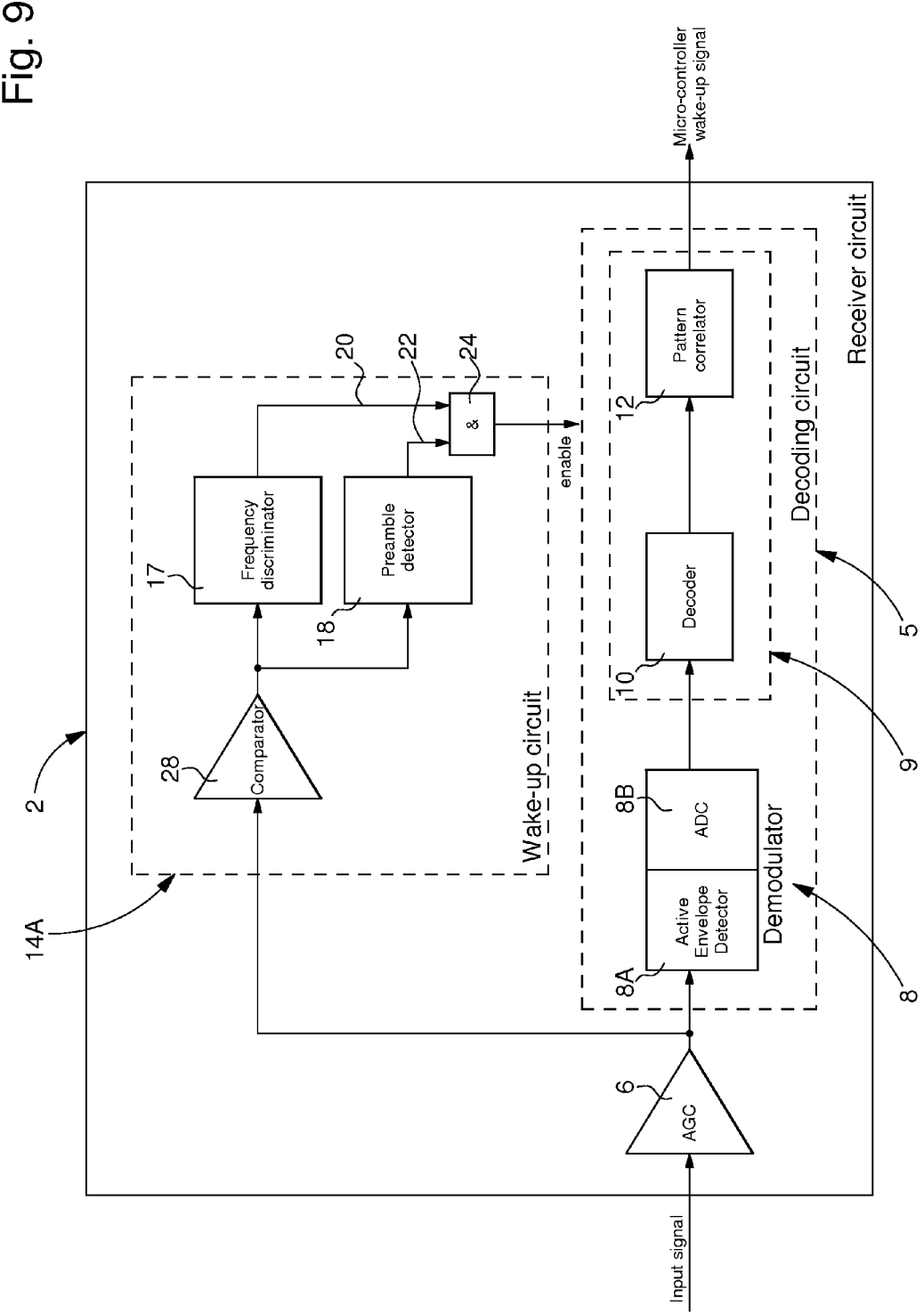

TRANSPONDER WITH RECEIVING MEANS HAVING A LOW ELECTRICAL CONSUMPTION IN A LISTENING MODE

This application claims priority from European Patent Application No. 11184988.1, filed Oct. 13, 2011, the entire disclosure of which is incorporated herein by reference.

FIELD OF THE INVENTION

The present invention concerns the domain of transponders comprising of an antenna and a receiver circuit for receiving RF signals which are amplitude modulated (AM). The receiver circuit generally comprises a demodulator, a decoder and often a wake-up circuit controlling the activation of at least a part of the receiver circuit and/or of a main logical unit in a transponder's listening mode or standby mode. The present invention is valid for any number of channels a device is supporting (typically 1 or 3 channels). More particularly, the present invention concerns transponders having an internal supply source like a battery, e.g. active transponders.

BACKGROUND OF THE INVENTION

To optimize current consumption in the receiver of a transponder equipped with a battery, a typical case is to use polling method. In such a polling method, the receiver is active (ON state) for a certain ON time period (or polling-on period) followed by an OFF time period (or polling-off period). This ON-OFF sequence is repeated continuously during the transponder's listening or standby mode. Alternatively, possible scenario with the receiver is to be constantly ON (OFF time period=0).

A typical telegram comprises a sequence with different parts defining:
- a continuous wave (CW) and/or a Preamble which is used in particular for analog circuitry settling in the transponder's receiver;
- a Sync pattern which is used by the transponder to synchronize the data decoder with the incoming data stream (ideally this is a unique pattern which never occurs in the wake-up pattern or in the data section);
- a Wake-up pattern (Identification pattern) that the transponder can decode for detecting whether the telegram is addressed to this transponder or not (so the microcontroller will be woken up only if the telegram is addressed to this transponder);
- a Data section; and
- an 'EOT' section indicating the end of the telegram transmission.

In the listening or standby mode, when starting polling-on period, a classical transponder is first checking each channel for any activity. For minimum power consumption such checking is done through a wake-up circuit which consumes less power than the whole receiver circuit of the transponder. The patent publication US 2010/0245153 discloses such a transponder. This document concerns an active transponder able to receive amplitude modulated interrogation signals. The transponder includes a high frequency input amplifier with a relatively broad bandwidth. Such an amplifier has relatively large electric power consumption and will also amplify interference signals received by the transponder with a modulation frequency closed to the predefined one for this transponder. In order to limit the power consumption in a standby mode, the document US 2010/0245153 proposes to arrange a passive envelope detector (8) between the antenna and the input amplifier; i.e. to arrange this input amplifier between two parts of the demodulator respectively formed by the envelope detector and a kind of analog-to-digital converter named 'circuit for demodulating' in this document. Then, in the standby mode, an activation unit defining a wake-up circuit is provided for controlling the activation of the input amplifier and the circuit for demodulating. This activation unit receives as input signal an envelope generated by the envelope detector and it detects through a low frequency circuit whether the modulation frequency of an interrogation signal received by the antenna corresponds to the predefined one. If this is the case, only then the high frequency input amplifier and the analog-to-digital converter are activated to demodulate the interrogation signal.

The active transponder described in US 2010/0245153 is interesting for resolving the power consumption problem of high frequency input amplifier. However, there are other problems which remains, in particular a sensitivity problem for the transponder. There are two reasons for this sensitivity problem. First the envelope detector is placed before the input amplifier so that this amplifier only amplifies the envelope of the received interrogation signal which may already have some distortion due to the passive envelope detector. Secondly, this passive envelope detector itself has a low sensitivity. Due to the specific design of the disclosed transponder with an activation unit which needs as input an envelope signal and due to the fact that no active element can be implemented before this activation unit in order to avoid, according to the aim of US 2010/0245153, high power consumption in the standby mode, the transponder described in this document has a relatively low sensitivity.

SUMMARY OF THE INVENTION

An object of the present invention is to propose a transponder with receiver means consuming less current in a noisy environment while having a high sensitivity and preferably also a high dynamic range.

The present invention concerns a transponder comprising an antenna and a receiver circuit for receiving Amplitude Modulated RF signals (AM-RF signals), this receiver circuit comprising a wake-up circuit and further at least a demodulator. The receiver circuit is associated to a control mechanism of the transponder activating this receiver circuit at least periodically in a listening mode. In this listening mode the wake-up circuit analyzes received RF signals and controls the activation of at least the demodulator in function of these received RF signals. The wake-up circuit receives as entry an alternating signal branched from the signal chain through the receiver circuit upstream from the demodulator and having the carrier frequency of the received RF signals. This wake-up circuit comprises a frequency discriminator arranged for detecting if the carrier frequency is within a given frequency range. The wake-up circuit further comprises a field clock generator and a digital modulation or preamble detector downstream from this field clock generator. The wake-up circuit activates at least the demodulator only when the carrier frequency of a received RF signal detected by the frequency discriminator is within a given frequency range and a modulation or a preamble is detected in this received RF signal by the digital modulation or preamble detector. In this document, 'upstream from a first element' means 'in the signal flow before this first element' and 'downstream from a second element' means 'in the signal flow after this second element'.

In a general preferred embodiment, the demodulator comprises an active envelope detector followed by an analog-to-digital converter.

In a further preferred embodiment, the digital modulation or preamble detector is formed by a clock-gap-clock detecting circuit.

In a particular preferred embodiment, the demodulator is arranged downstream from an AGC amplifier.

In a further particular preferred embodiment, the field clock generator is arranged upstream from the frequency discriminator which is formed by a digital circuit.

In a variant, the frequency discriminator and the modulation or preamble detector are both formed by a same logic circuit unit.

In a further variant, the field clock generator is formed by a comparator with a determined hysteresis defining an analog-to-digital converter.

In a particular embodiment, the wake-up circuit further controls the activation of a decoder and of a pattern correlator.

In a further particular embodiment, the alternating signal is branched between the AGC amplifier and the demodulator, this AGC amplifier been activated when the receiver circuit is activated in a listening mode.

In another particular embodiment, the wake-up circuit comprises an amplifying unit arranged before the field clock generator and receiving the RF signals directly from the antenna.

In a first variant of this last particular embodiment, the wake-up circuit further controls the activation of an ACG amplifier arranged upstream from the demodulator.

In a second variant of the last particular embodiment, the receiver circuit comprises a sensitivity control unit arranged for varying the sensitivity of the wake-up circuit and in particular for reducing, if said sensitivity is greater than a minimum level, this sensitivity when the carrier frequency of a received RF signal is within a given frequency range but no modulation or preamble is detected in the received RF signal by the digital modulation or preamble detector.

In a third variant of the last particular embodiment, the sensitivity control unit is further arranged for reducing, if said sensitivity is greater than said minimum level, this sensitivity of the wake-up circuit when the carrier frequency of a received RF signal is above the given frequency range or in a second given frequency range higher than this given frequency range.

In a general variant of the last particular embodiment, the sensitivity reduction is done stepwise.

BRIEF DESCRIPTION OF THE DRAWINGS

The present invention will be described subsequently in more detail with reference to the attached drawings, given by way of examples, but in no way limited thereto, in which:

FIG. 7 is a block diagram of a fourth embodiment of a transponder according to the present invention;

FIG. 9 is a block diagram of a second embodiment of a transponder according to the present invention

DETAILED DESCRIPTION OF THE INVENTION

In a general embodiment of a transponder according to the invention, this transponder comprises an antenna and a receiver circuit for receiving Amplitude Modulated RF signals (AM-RF signals). The receiver circuit comprises a wake-up circuit and further at least a demodulator. The receiver circuit is associated to a control mechanism of the transponder activating this receiver circuit at least periodically in a listening mode in which the wake-up circuit analyzes received RF signals and controls the activation of at least the demodulator in function of these received RF signals. The wake-up circuit receives as entry an alternating signal branched from the signal chain through the receiver circuit upstream from the demodulator and having the carrier frequency of the received RF signals. The wake-up circuit comprises a frequency discriminator arranged for detecting if the carrier frequency is within a given frequency range and further comprises a field clock generator and a digital modulation or preamble detector following this field clock generator. The wake-up circuit activates at least the demodulator only when the carrier frequency of a received RF signal detected by the frequency discriminator is within a given frequency range and a modulation or a preamble is detected in this received RF signal by the digital modulation or preamble detector.

Figure 1:
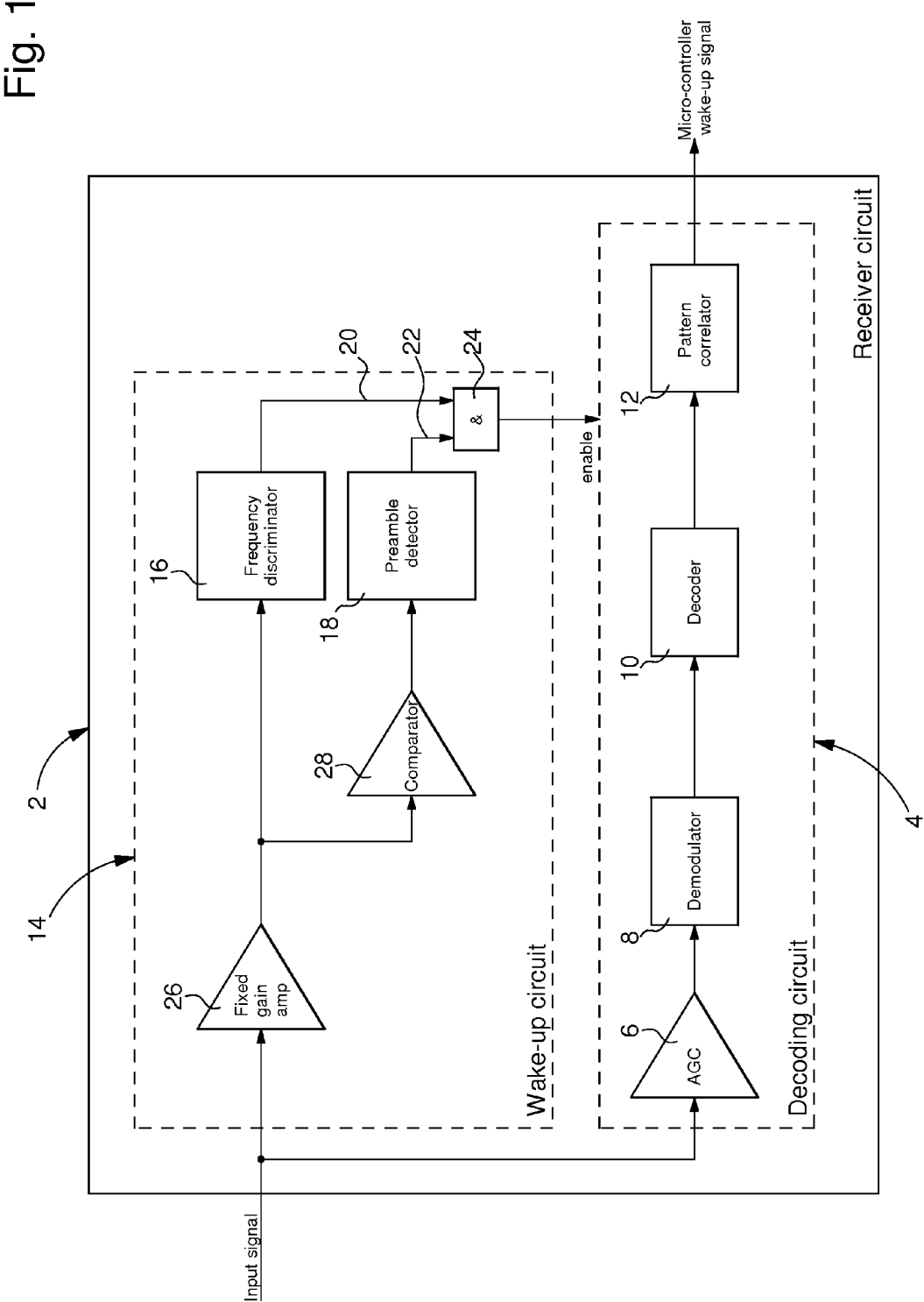
FIG. 1 is a block diagram of a first embodiment of a transponder according to the present invention.

With the help of FIG. 1 a first embodiment of a transponder according to the present invention will be described. The transponder comprises an antenna (not shown) and a receiver circuit 2 arranged for receiving RF signals. The antenna converts received RF signals into analog alternating electrical signals having the carrier frequency of these RF signals (in the no-modulated phases) and defining input signals for the receiver circuit. This receiver circuit 2 is associated to control means (not shown) activating itself at least periodically in a listening mode. The receiver circuit comprises a decoding circuit 4 which is formed by an AGC amplifying circuit 6 (Automatic Gain Control amplifier, i.e. an amplifier with an Automatic Gain Control), a demodulator 8, a decoder 10 and a pattern correlator 12. The demodulator is arranged downstream from the AGC amplifying circuit 6 (AGC amplifier). The pattern correlator allows detecting an identification code in each received signal in order to determine if the received signal is a valid signal for the transponder, i.e. a signal which is addressed to this transponder. Further, the receiver circuit comprises a wake-up circuit 14 analyzing, in the listening mode, received input signals and arranged for controlling the activation of the decoding circuit in this listening mode. The wake-up circuit receives as entry directly the input signals. This wake-up circuit comprises a frequency discriminator 16 for detecting if the carrier frequency of a received RF signal is within a given frequency range (for example 115-135 kHz for a nominal frequency of the system at 125 kHz). If this is the case, the carrier frequency of the RF signal is considered to match with the nominal frequency of the system in which the transponder is implemented.

The wake-up circuit further comprises a digital modulation or preamble detector 18 (hereafter 'preamble detector') and this wake-up circuit activates the decoding circuit 4 only when a modulation or a preamble is detected in the received RF signal by this preamble detector and a valid carrier frequency has being detected by the frequency discriminator. To that end, the frequency discriminator 16 has an output providing a logic signal 20 defining if the detected frequency is correct (High state) or not (Low state). The preamble detector has also an output providing a logic signal 22 defining if a modulation or a preamble is detected (High state) or not (Low state). Both logic signals 20 and 22 are provided to an 'AND' logic element 24 (AND gate) which will enable the activation of the decoding circuit for further treatment of the incoming RF signal only if these two logic signals have both a High state.

Thanks to the preamble detector, it is now possible to detect e.g. a continuous signal (not modulated carrier signal) with a correct frequency without activating the decoding circuit. The transponder of the present invention uses a digital preamble detector in the wake-up circuit for selecting potentially valid received signals. This digital preamble detector consumes much less current than the decoding circuit. In a preferred variant, the preamble detector is a clock-gap-clock detecting circuit. Between the input of the wake-up circuit and the digital preamble detector is an arrangement of a fixed gain amplifier 26 followed by a comparator 28 with a given hysteresis. The fixed gain amplifier is used for linearly amplifying small input levels (e.g. <1 mVpp) to reasonable signal levels (e.g. 200 mVpp) for further processing. The comparator with hysteresis generates an alternating digital signal at the frequency of the carrier of the received RF signal (field clock) in case the amplified signal is above the hysteresis level. Signals or parts of it with levels below the hysteresis level are blocked. This hysteresis defines the sensitivity limit for the detection of an incoming signal by the wake-up circuit. The comparator 28 forms a field clock generator arranged upstream from the digital preamble detector. It is to be noted that the signal chain from input of the receiver circuit to the comparator 28 can be differential or single ended. The electrical consumption of the wake-up circuit 14 is approximately one microampere or less (1 µA or <1 µA) but the electrical consumption of the decoding circuit is approximately three microamperes (3 µA). To minimize the activation of the decoding circuit 4 by spurious signals is thus important for minimizing the power consumption of the transponder. The present invention achieves this aim in a very efficient manner without decreasing the sensitivity of the receiver circuit.

With the help of FIG. 9, a second embodiment of the invention will be described. The transponder comprises a receiver circuit 2 comprising an entry amplifier formed by an AGC amplifier 6, a decoding circuit 5 and a wake-up circuit 14A. The decoding circuit 5 comprises an active demodulator 8 formed by an active envelope detector 8A followed by an analog-to-digital converter 8B (ADC). Such an active demodulator is preferred because it has a high sensitivity. However, this active demodulator has a relatively high electrical consumption (more than 1 µA and possibly around 1.2 µA). The digital part 9 of the decoding circuit comprises a decoder 10 and a pattern correlator 12. It is to be noted that this digital part could be arranged in a logic circuit having further functions, i.e. be part of a logic unit. This logic part of the decoding circuit 5 has also a relatively high electrical consumption (e.g. around 1 µA). Thus, the decoding circuit 5 generally consumes more than two microamperes (>2 µA). According to the invention, the wake-up circuit 14A receives as entry an alternating signal branched from the signal chain through the receiver circuit 2 upstream from the demodulator 8. This alternating signal is a non-demodulated signal which has thus the carrier frequency of the received RF signals. More particularly, the alternating signal is branched between the AGC amplifier 6 and the active demodulator 8, this AGC amplifier 6 been activated together with the wake-up circuit 14A when the receiver circuit is activated in a listening mode.

The wake-up circuit 14A comprises a field clock generator formed by a comparator 28 already described, a frequency discriminator 17 and a preamble detector 18 as well as a logic element 24 (AND gate) receiving two signals respectively from the frequency discriminator and the preamble detector. The signal provided by the logic circuit 24 is used for controlling the activation of the decoding circuit 5. In this embodiment, the comparator 28 is arranged upstream from the frequency discriminator and the preamble detector so that both can be formed by a digital circuit. Thus, the wake-up circuit can have a high sensitivity with an appropriate comparator and such a wake-up circuit has a relatively low energy consumption, e.g. under 0.5 microampere (<0.5 µA). The wake-up circuit has a high sensitivity which can be similar to the one of the assembly comprising the AGC amplifier 6 and the active demodulator 8 used for demodulating input signals. In conclusion, when the transponder receives a spurious signal which can be detected by the wake-up circuit, the transponder according to this second embodiment will consume less than half the consumption of a transponder having a decoding circuit 5 without such a wake-up circuit. Thanks to the present invention, this is obtained for a transponder having a receiver circuit 2 with a high sensitivity and also a high dynamic range (in particular due to the use of the AGC amplifier 6).

Figure 2:
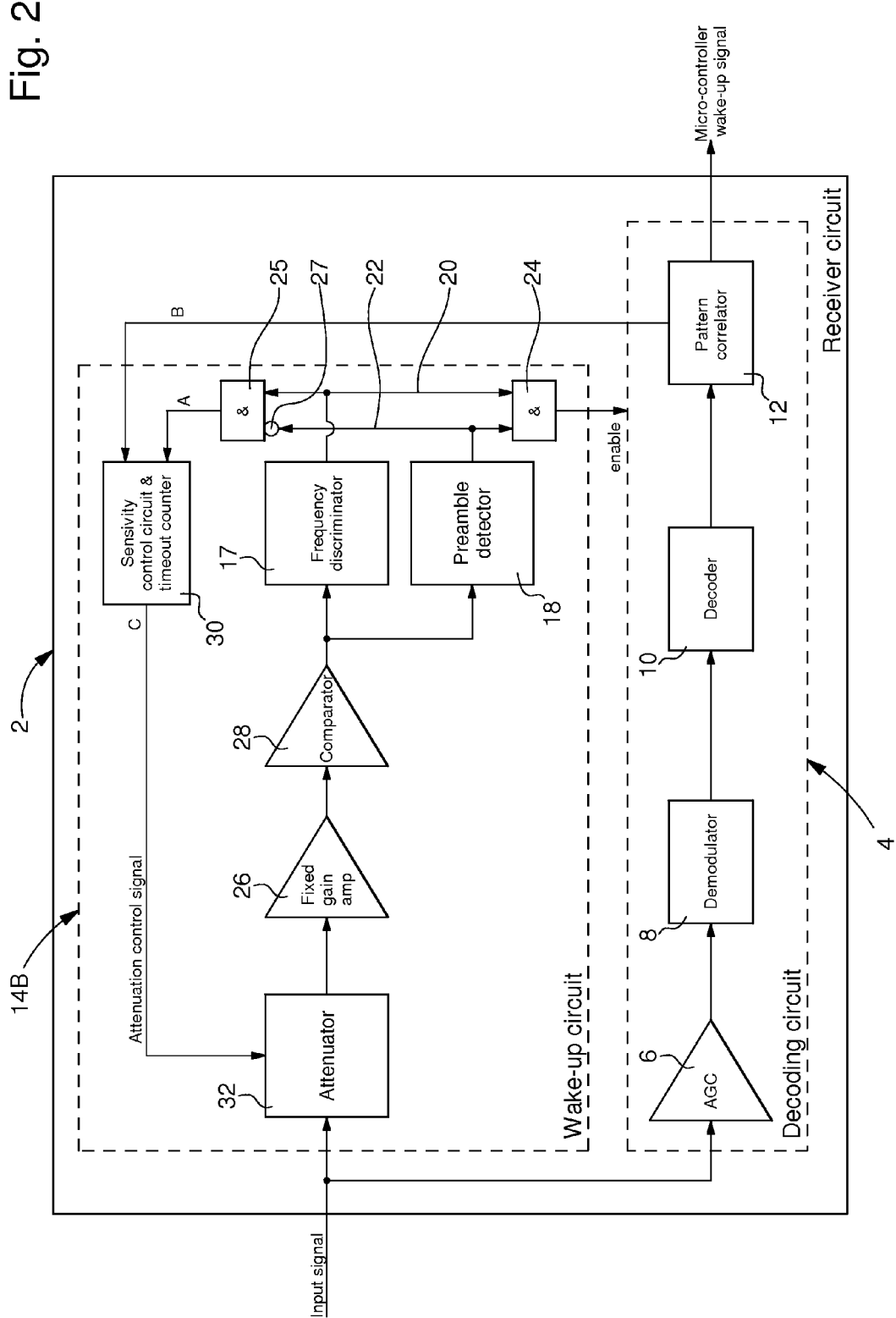
FIG. 2 is a block diagram of a third embodiment of a transponder according to the present invention.

FIG. 2 shows a third embodiment of the invention which consumes less than the second embodiment of FIG. 9. The AGC amplifier is an analog active circuit which consumes relatively a lot of electrical energy (e.g. 0.8 µA). The third embodiment of FIG. 2 differs from the one of FIG. 9 in that the AGC amplifier 6 is not activated together with the wake-up circuit but only with the demodulator and is thus incorporated in the decoding circuit 4 as it is the case in the first embodiment of FIG. 1. However, this third embodiment is an improvement of the first embodiment in that it solves a problem linked to the fixed gain amplifier 26 which has preferably a high gain for high sensitivity. Such a fixed gain amplifier used alone before the field clock generator 28 can miss valid signals having a high amplitude level as this will be explained hereafter. The wake-up circuit 14B of this third embodiment differs from the wake-up circuit 14 of the first embodiment in that the wake-up circuit comprises a digitally controlled variable gain amplifying unit which is controlled by a sensitivity control circuit 30 (via line C). This sensitivity control circuit provides an attenuation control signal to the variable gain amplifying unit.

In the variant represented in FIG. 2, the digitally controlled variable gain amplifying unit is formed by a digitally controlled attenuator 32 and a fixed gain amplifier 26 (high gain amplifier). In a further variant (not shown), this digitally controlled variable gain amplifying unit is formed by a digitally controlled variable gain amplifier. The comparator 28 with a determined hysteresis defines an analog-to-digital converter which is arranged between the digitally controlled variable gain amplifying unit and the preamble detector 18. In a preferred variant, as represented in FIG. 2, the comparator 28 is also arranged between the digitally controlled variable gain amplifying unit and the frequency discriminator 17 which is formed in this case by a digital circuit. The frequency discriminator is arranged for counting the number of field clock pulses within a time window defined by an internal reference time base (for validating a frequency the number of counted clock pulses within a predefined time window has to be within a predefined range).

First, the sensitivity control unit is implemented to vary the sensitivity of the wake-up circuit and in particular for reducing, if the sensitivity is greater than a minimum level, this sensitivity when the carrier frequency of a received RF signal is within a given frequency range but no modulation or preamble is detected in the received RF signal by the digital modulation or preamble detector 18. To that end, the logic signal 20 generated by the frequency discriminator 17 is provided to a first input of an 'AND' logic element 25 (AND gate) and the logic signal 22 generated by the preamble detector 18 is also provided to a second input of the AND gate 25 through a logic inverter element 27 located before the second input. The output of AND gate 25 is connected to the sensitivity control circuit 30 (line A) and this AND gate is also a part of the sensitivity control unit according to the present invention.

Further, in order to eliminate the situation where an input signal is modulated with a correct carrier frequency but this input signal is not intended for the transponder in question, the sensitivity control unit is arranged, according to an improved variant also implemented in the design of FIG. 2, for varying the sensitivity of the wake-up circuit 14B and in particular for reducing, if this sensitivity is greater than a minimum level, the sensitivity when the decoding circuit 4 has been activated one time or, in a particular variant, several times by the wake-up circuit receiving a spurious modulated RF signal with a valid carrier frequency. The Pattern correlator 12 is connected to the sensitivity control circuit 30 (represented by line B) which thus can receive a control signal from the decoding circuit 4.

Figure 3:
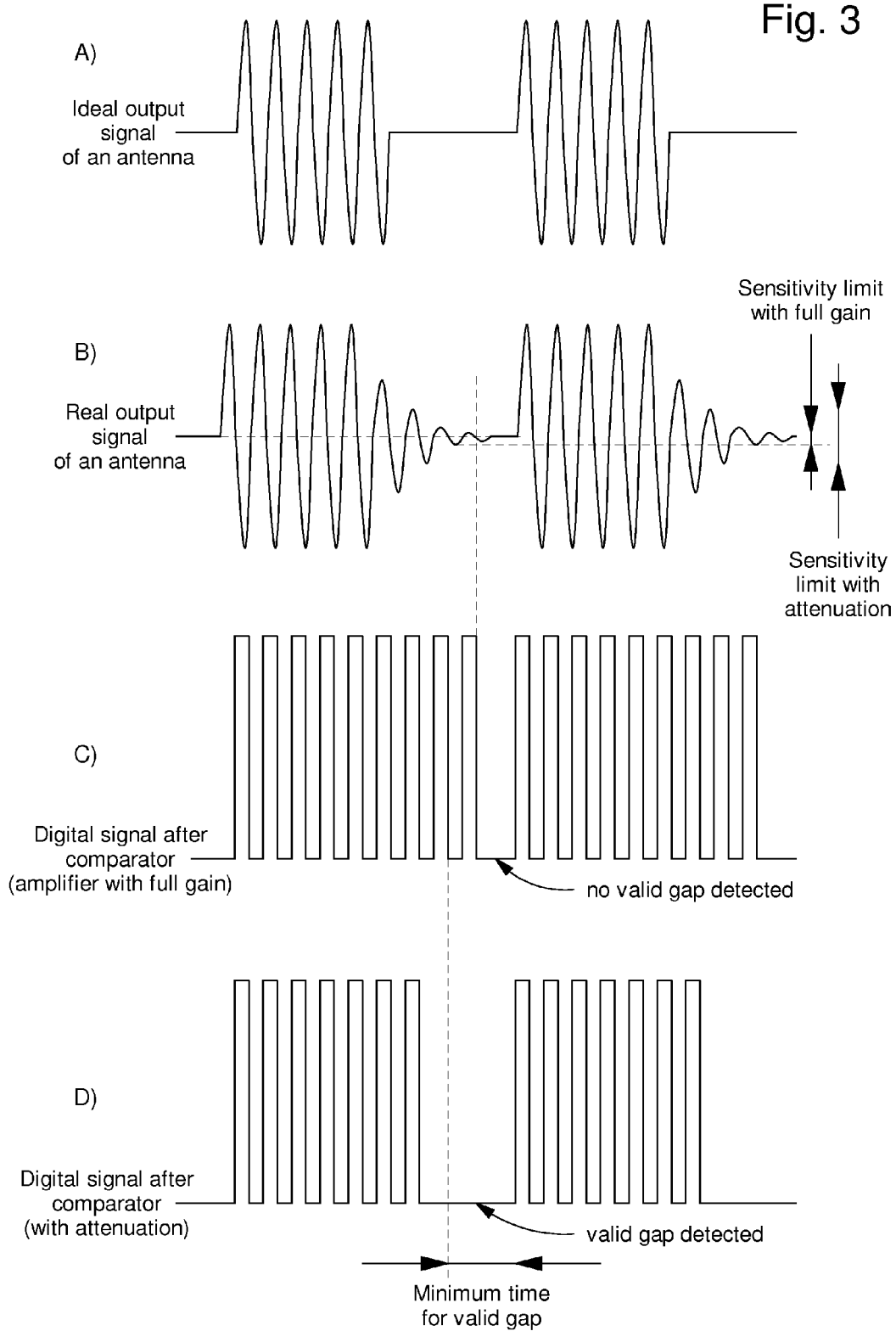
FIG. 3 schematically shows a real modulated signal at the output of an antenna and the resulting digital signal after a comparator following an amplifier with high gain or with an attenuated gain.

The functioning of the transponder of FIG. 2 will be explained with the help of FIGS. 3 and 4. FIG. 3 shows signal shapes of a typical preamble at different stages in the wake-up circuit. FIG. 3A) represents an ideal output signal of an antenna with sharp edges when receiving a modulated signal with a succession of '1' or '0' (e.g. in a Manchester coded format). In reality the maximized Q-factor of the antenna results in a slow decay of the antenna output signal during the OFF phases of the field, as schematically shown in FIG. 3B). For strong signal conditions this will result in the following issue: If the sensitivity level is near its maximum limit, due to the fixed high gain of the amplifier 26, field clock pulses are still generated after the comparator 28 during a significant period in each decay phase, as represented in FIG. 3C). This makes preamble detection for the preamble detector 18 very difficult or even impossible because a minimum time period is generally needed for establishing the presence of a valid gap indicating the reception a modulated signal sent by a reader or transmitter. Thus, a valid signal with a strong RF field received by the antenna of the transponder will normally not be detected as such by the wake-up circuit. This is a remaining problem of the embodiment of FIG. 1. However, thanks the added features of the second embodiment, when the frequency is detected as valid (Frequency ok) by the frequency discriminator but no gap is detected by the preamble detector, the AND gate 25 sends a signal to the sensitivity control circuit 30 to indicate this situation so that this circuit 30 decreases the sensitivity of the wake-up circuit by acting on the attenuator 32. Thus, by doing so, if the received RF signal is a modulated signal, the sensitivity limit will increase and the number of field clock pulses at the output of the comparator in the gap zone will decrease until a valid gap is detected (Preamble ok), as represented in FIG. 3D), or the sensitivity level is decreased to a low enough level to eliminate field clock signals at the output of the comparator. Two examples corresponding to these two cases are respectively given in FIGS. 4 and 5.

Figure 4:
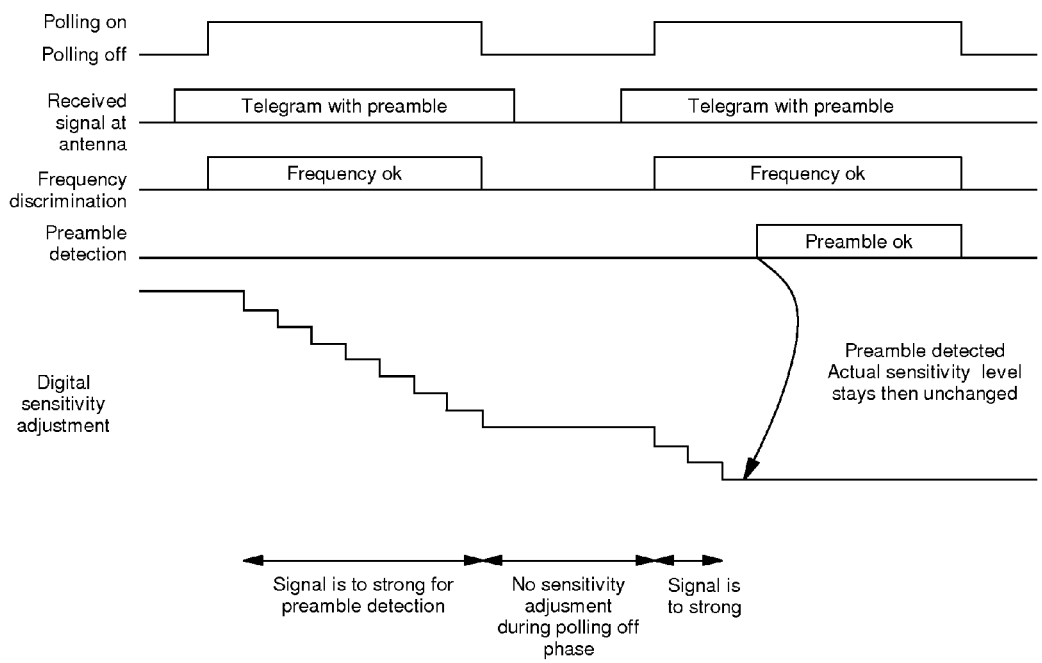
FIG. 4 is a time graph showing the sensitivity adjustment of the wake-up circuit in the third embodiment of FIG. 2 when the transponder receives a valid telegram in strong field.
Figure 5:
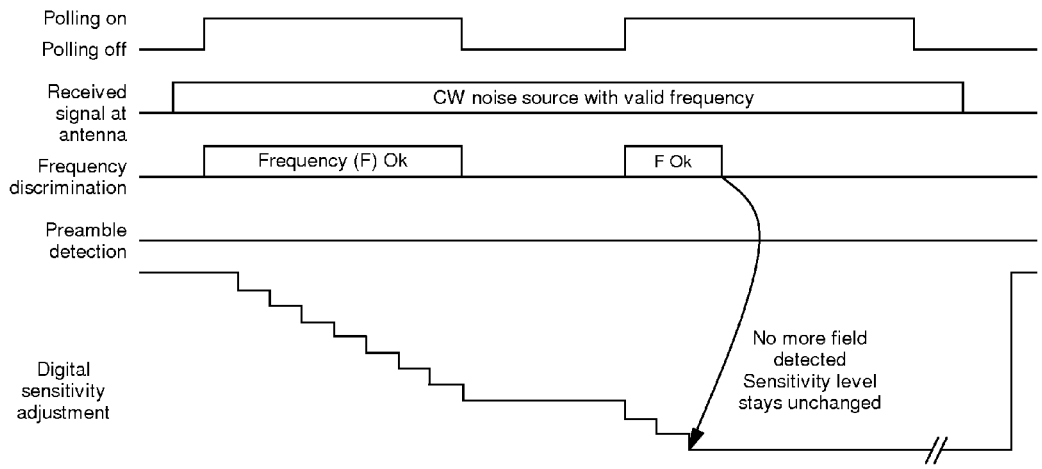
FIG. 5 is a time graph showing the sensitivity adjustment of the wake-up circuit in the third embodiment of FIG. 2 when the transponder receives a continuous wave (CW) signal with a valid frequency.

In FIGS. 4 and 5, the sensitivity reduction is done stepwise. Preferably, when the carrier frequency of a received RF signal is within a given frequency range (Frequency ok) and no modulation or preamble is detected in this received RF signal, the sensitivity control unit periodically decreases, during polling-on phases, the sensitivity by a further step after a determined time period less than one half a polling-on period defined by the control mechanism controlling the activation of the receiver circuit in the listening mode. In the preferred variants represented in FIGS. 4 and 5, the determined time period is a short period corresponding to a few data bits of a valid RF signal. The duration of the time period is generally dependent on the time needed by the preamble detector for receiving a clock signal with the adjusted sensitivity level of the wake-up circuit and for analyzing this signal in order to detect a potential gap. During polling-off phases, there is no sensitivity adjustment or variation. If a preamble is finally detected at a certain sensitivity level, as it is the case in FIG. 4, the wake-up circuit then activates the decoding circuit and the sensitivity level of the wake-up circuit then remains unchanged until the microcontroller is activated in the case of reception of a valid signal or during a certain time period in which the pattern correlator has not found a correct pattern (identification code) and thus gives at the end of this certain time period a feedback signal (via line B) of this situation to the sensitivity control circuit 30 which then will further decrease the sensitivity of the wake-up circuit until a signal is no longer detected by this wake-up circuit so that the activation of the decoding circuit will no longer be enabled, resulting in a deactivation of this decoding circuit.

The wake-up circuit further comprises a timeout counter associated with the sensitivity control circuit and used to increase again the sensitivity after a defined time period within which the decreased sensitivity has not been varied in the listening mode of the transponder. If no preamble has been detected with a sensitivity decrease to a minimum level or if no more clock signals are detected by the frequency discriminator, as it is the case in FIG. 5, the sensitivity level stays unchanged and there is no activation of the decoding circuit. Again, the sensitivity is increased after a defined time period within which the decreased sensitivity has not been varied in the listening mode of the transponder. The sensitivity increase can be done in steps or directly to a maximum sensitivity level. The increasing steps can be higher than the decreasing steps. In a particular variant, the increase occurs in two steps, the first step corresponding to half the total sensitivity decrease. Other variants can be implemented by the person skilled in the art.

Figure 6A:
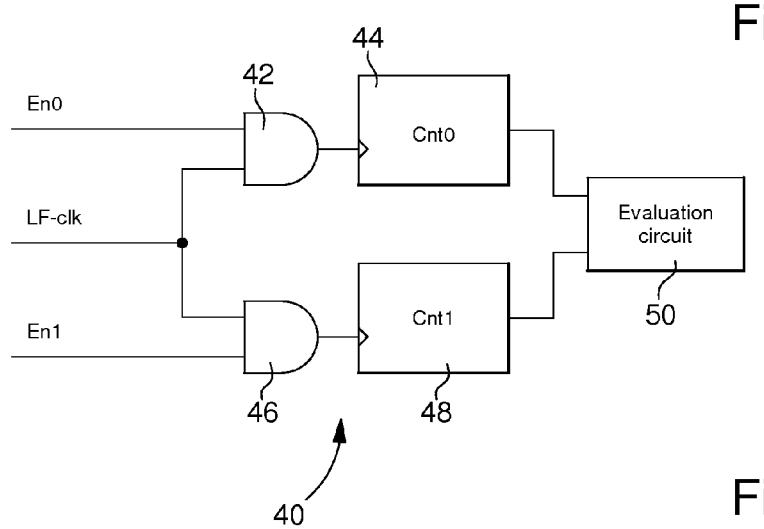
FIG. 6A shows a variant of a logic circuit forming a part of the wake-up circuit in the second embodiment of FIG. 9 and in the third embodiment of FIG. 2.
Figure 6B:
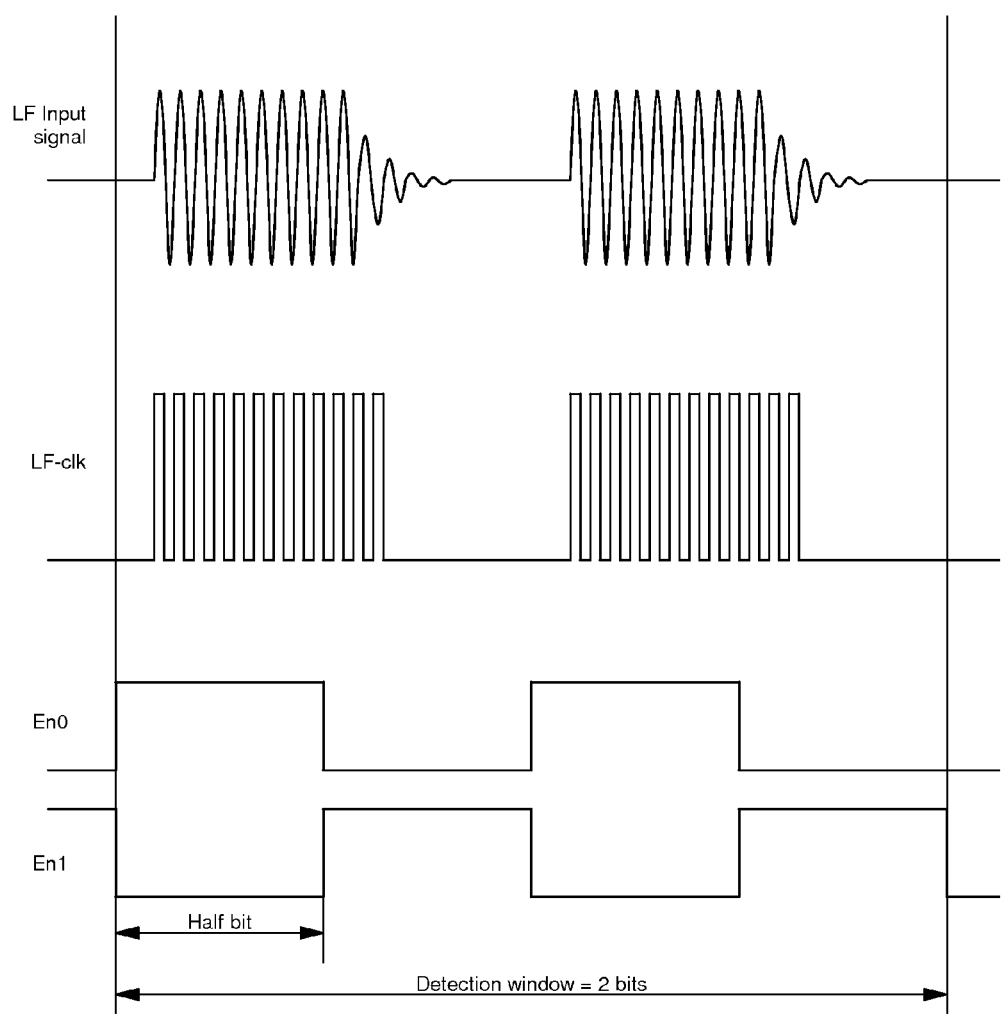
FIG. 6B shows the signals entering the logic circuit of FIG. 6A.

FIG. 6A shows a particular electronic design of a logic circuit 40 which incorporates a frequency discriminator and a preamble detector according to the invention. This logic circuit can be implemented in the second embodiment of FIG. 9 and in the third embodiment of FIG. 2. The frequency discriminator and the preamble detector are both formed by a same logic circuit unit in this particular variant. FIG. 6B shows the input signals of the logic circuit 40 when the wake-up circuit receives a certain LF Input signal. The logic circuit comprises a first flip-flop element 42 receiving the digital signal (LF-clk) from the comparator 28 and a digital signal En0 which corresponds to a succession of '1' (High state) and '0' (Low state) each having the duration of a half-bit. In a variant, the first flip-flop element is just a 'AND' gate to direct the clock to the right counter. Flip-flop has thus here a general meaning linked to its switching function. There might be a flip-flop before to get the LF-clk signal synchronized to the local system clock. In another variant, flip-flops are only in the counters (Cnt0 & Cnt1). Thus, different realizations are possible for a person skilled in the art. The same remarks apply to the second flip-flop element mentioned hereafter.

In the specific example given at FIG. 6B, a detection cycle comprises a detection window of two bits (data bits of a valid signal). The output of the flip-flop element 42 is connected to a first counter 44 which counts, during each detection window, the number of clock pulses Cnt0 in the digital signal LF-clk when the signal En0 has the value '1', i.e. during a first half-bit period and a third half-bit period of the detection window. At the end of each detection window, the first counter provides the detected number of clock pulses Cnt0 to an evaluation circuit 50. The logic circuit further comprises a second flip-flop element 46 receiving the digital signal (LF-clk) from the comparator 28 and a digital signal En1 which corresponds to a succession of '0' (Low state) and '1' (High state) each having the duration of a half-bit. The output of the flip-flop element 46 is connected to a second counter 48 which counts, during each detection window, the number of clock pulses Cnt1 in the digital signal LF-clk when the signal En1 has the value '1', i.e. during a second half-bit period and a fourth half-bit period of the detection window. At the end of each detection window, the second counter provides the detected number of clock pulses Cnt1 to the evaluation circuit 50.

The digital signals En0 and En1 are generated in the transponder with the help of an internal time base (e.g. 32 kHz oscillator). These two digital signals have a shape corresponding to the envelope of the clock-gap-clock signal defining the preamble of a valid signal and are offset by a half-bit in order to define two complementary signals. In the variant shown in FIG. 6B, when En0 matches with a received ideal preamble (which is generally not the case as represented on this FIG. 6B), Cnt0 corresponds to the number of clock pulses (oscillations) during two bits and Cnt1 is equal to zero because En1 directs the clock pulses Cnt1 to the counter 48 only during two gaps of the preamble. Values Cnt0 and Cnt1, available in the counters at the end of each detection window, are used for evaluation in the evaluation circuit 50. A method of evaluation is described hereafter.

The evaluation uses a Sum value (Sum=Cnt0+Cnt1) and a Diff value (Diff=ABS(cnt0−cnt1)). In the ideal case of exact match, the Diff value should be the same as the Sum value because one of the counters would be active only during phases of the detection window with modulated zones (gaps) of the telegram/received RF signal. In reality, we have to define minimal and maximal threshold values for the Sum value and a minimal threshold value for the Diff value because the internal time base does not know where are the edges between modulated zones (gaps) and no modulated zones (field clock/carrier received).

1. Condition for a Valid Frequency (F Ok):

Frequency of LF clock pulses should be in a defined range (115 kHz-135 kHz). This means that the number of counted clock pulses must be in a predefined range (PreambleTHR_MIN; PreambleTHR_MAX) and values in both counters should be lower than a predefined maximum value (OVFLthr), i.e.

PreambleTHR_MIN<Sum<PreambleTHR_MAX

Cnt0<OVFLthr

Cnt1<OVFLthr

2. Conditions for the Detection of a Preamble:

If the LF signal contains gaps, it should be possible to calculate a Diff value which is higher than a predefined value (PreambleDIFF) in the case the offset between the received preamble and the signal En0 or En1 is low enough (one of the counters has to count more clock pulses than the other one), i.e.

PreambleDIFF<Diff

In case no valid criterion is detected for a preamble, the algorithm is restarted with ¼ bit offset to have a different alignment between the detection window and an incoming preamble. It is possible to select another offset (e.g. ⅛ bit) for allowing a better alignment between the incoming preamble of a received signal and the signals En0 or En1. In such a case, the algorithm could be restarted more than two times, e.g. when the initial offset between the incoming preamble of a received signal and the signals En0 or En1 approximately corresponds to ¼ bit. It is to be noted that the evaluation algorithm can be more sophisticated in others variants of the invention. For example, it is possible to change the direction of a second offset operated by the implemented algorithm by simultaneously doubling its value when the calculated Diff value increases after having restarting the algorithm with a first offset when the preamble criterion was initially negative.

The above described algorithm corresponds to a clock-gap-clock detection algorithm. Others algorithms can be implemented in other variants for detecting the presence of gaps in a received RF signal, e.g. an edge detecting circuit.

An improved fourth embodiment will now be described with the help of FIGS. 7 and 8. Already described elements will not be described again in detail hereafter. The transponder of FIG. 7 essentially differs from the one of FIG. 2 in that the sensitivity control unit is further implemented to reduce, if the sensitivity is greater than a minimum level, the sensitivity of the wake-up circuit 14C when the carrier frequency of a received RF signal is above the valid frequency range (Frequency ok) or in a second frequency range higher than this valid frequency range. To that end, the frequency discriminator 56 is arranged for distinguish between a first frequency of the carrier of a RF signal within a first frequency range corresponding to a valid or correct frequency (F=ok) and a second frequency which is above this first frequency range or within a second frequency range located above the first one. Further, an 'OR' logic element (OR gate) 60 is implemented in the sensitivity control unit. This OR gate 60 is connected to line A outputting the AND gate 25 and to the output line of the frequency discriminator 56 in which a logic signal 58 indicates if the frequency is too high (High state) or not (Low state). The output of the OR gate 60 is connected to the sensitivity control circuit 30 via line D. In a variant, the logic signal 58 is directly provided to the sensitivity control circuit and no OR gate 60 is provided. This allows the sensitivity control circuit to deal differently with the logic signal 58 than the one provided by line A (see FIG. 2) which in this case is directly connected to the sensitivity control circuit 30, e.g. by using different step values in response to both logic signals.

Figure 8:
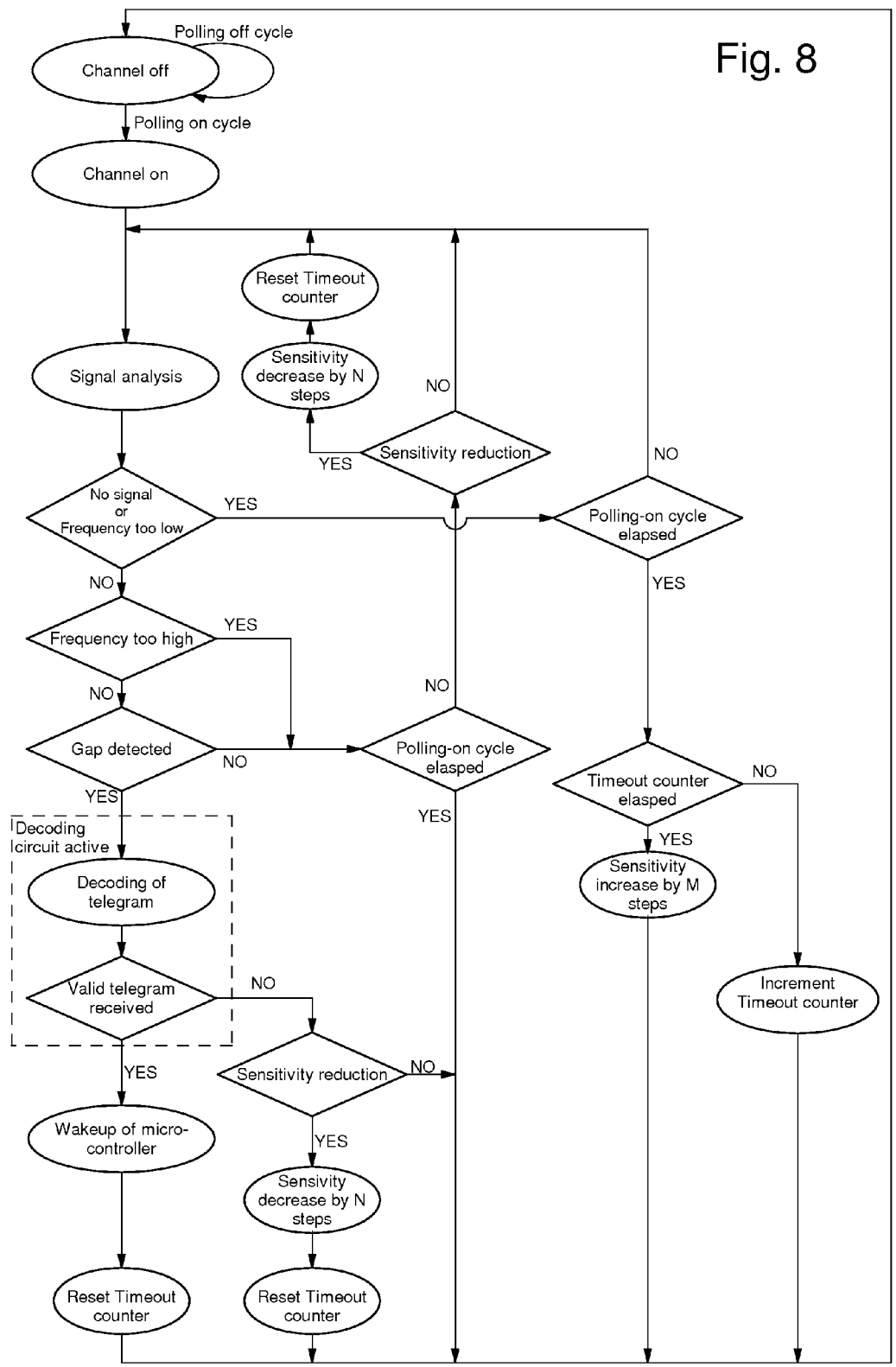
FIG. 8 is a flowchart corresponding to the method for the sensitivity adjustment of the wake-up circuit implemented in the fourth embodiment of FIG. 7.

FIG. 8 is a flowchart corresponding to the algorithm implementing in the receiver circuit of FIG. 7.

In a variant wherein the circuit and the method described in relation to FIGS. 6A and 6B are used, we have the following situation:

The decision criterion 'No signal or Frequency too low' corresponds to Sum<PreambleTHR_MIN=>'Yes', otherwise it is 'No'

The decision criterion 'Frequency too high' corresponds to Sum>PreambleTHR_MAX or Cnt0>OVFLthr or Cnt1>OVFLthr=>'Yes', otherwise it is 'No' (which corresponds to the positive case of the algorithm given before).

A) No Signal or Frequency Too Low:

It is clear that "No signal" does not need any sensitivity reduction. "Frequency too low" can happen in the case of an interference signal (with low frequency) with higher amplitude than a wanted signal. In this case a sensitivity reduction is not beneficial.

B) Frequency Too High:

This could happen when there is a valid signal (telegram) and an interference signal is with a lower amplitude than the wanted signal. In such situation the envelope of the incoming signal does not look like 100% ASK anymore. It could look like e.g. 50% ASK (in particular because a spurious signal generally appears in the gaps of the wanted modulated signal). If the signal chain is working on high sensitivity, the output signal of the comparator will look like a CW signal. Therefore, it makes sense to decrease the sensitivity until the signal chain is no longer able to receive the interference signal. Then, the wake-up circuit has a chance to find the necessary gap for enabling the decoding circuit.

It is to be noted that the flowchart of FIG. 8 has a decision criterion 'Sensitivity reduction'. This means that, in a specific variant, the sensitivity decrease is not done in each algorithm cycle, but the evaluation circuit or the sensitivity control circuit can generates an attenuation control signal only periodically each N negative detection cycles or on a statistical basis. Nevertheless, in order to have a rapid reactivity, it is preferred to vary the sensitivity after each detection cycle with no gap or a too high frequency.

What is claimed is:

1. A transponder comprising:
an antenna; and
a receiver circuit to receive Amplitude Modulated RF signals (AM-RF signals), the receiver circuit comprising a wake-up circuit and further at least one demodulator, the receiver circuit being associated to a control mechanism of the transponder activating the receiver circuit at least periodically in a listening mode in which the wake-up circuit analyzes received RF signals and controls activation of the at least one demodulator in function of the received RF signals,
wherein the wake-up circuit receives as entry an alternating signal branched from a signal chain through the receiver circuit upstream from said demodulator and having a carrier frequency of the received RF signals,
wherein the wake-up circuit comprises a frequency discriminator arranged to detect when said carrier frequency is within a given frequency range,
wherein the wake-up circuit further comprises a field clock generator and a digital modulation or preamble detector downstream from the field clock generator,
wherein said digital modulation or preamble detector is formed by a clock-gap-clock detecting circuit including an evaluation circuit arranged to detect in a signal provided by the field clock generator the presence of gaps which have at least a predefined minimum time, and
wherein the wake-up circuit is arranged to activate at least the demodulator to perform demodulation of the received RF signal only when said carrier frequency of a received RF signal detected by the frequency discriminator is within a given frequency range and a modulation or a preamble is detected in the received RF signal by the digital modulation or preamble detector, the wake-up circuit comprising an AND logic element receiving from the frequency discriminator a first logic signal and from the digital modulation or preamble detector a second logic signal, the first logic signal defining if the carrier frequency is within the given frequency range, the second logic signal defining if gaps having at least the predefined minimum time are detected in the signal provided by the field clock generator, and the AND logic element outputting a control signal provided to the wake-up circuit and enabling the activation of at least said demodulator only if the first and second logic signals have both a High state.

2. The transponder according to claim 1, wherein said demodulator comprises an active envelope detector followed by an analog-to-digital converter.

3. The transponder according to claim 1, wherein said demodulator is arranged downstream from an AGC amplifier.

4. The transponder according to claim 2, wherein said demodulator is arranged downstream from an AGC amplifier.

5. The transponder according to claim 1, wherein said field clock generator is arranged upstream from the frequency discriminator which is formed by a digital circuit.

6. The transponder according claim 5, wherein said field clock generator is formed by a comparator with a determined hysteresis defining an analog-to-digital converter.

7. The transponder according claim 1, wherein said field clock generator is formed by a comparator with a determined hysteresis defining an analog to digital converter.

8. The transponder according to claim 5, wherein said frequency discriminator and said modulation or preamble detector are both formed by a same logic circuit unit.

9. The transponder according to claim 1, wherein the rake-up circuit further controls activation of a decoder and of a pattern correlator.

10. The transponder according to claim 3, wherein said alternating signal is branched between the AGC amplifier and the demodulator, this AGC amplifier been activated when the receiver circuit is activated in a listening mode.

11. The transponder according to claim 4, wherein said alternating signal is branched between the AGC amplifier and the demodulator, this AGC amplifier been activated when the receiver circuit is activated in a listening mode.

12. The transponder according to claim 1, wherein the wake-up circuit comprises an amplifying unit arranged before the field clock generator and receiving the RF signals directly from the antenna.

13. The transponder according to claim 12, wherein the wake-up circuit further controls activation of an ACG amplifier arranged upstream from the demodulator.

14. The transponder according to claim 12, wherein the receiver circuit comprises a sensitivity control unit arranged for varying the sensitivity of the wake-up circuit and in particular for reducing, if said sensitivity is greater than a minimum level, this sensitivity when the carrier frequency of a received RF signal is within said given frequency range but no modulation or preamble is detected in said received RF signal by the digital modulation or preamble detector.

15. The transponder according to claim 14, wherein said sensitivity control unit is further arranged for reducing, if said sensitivity is greater than said minimum level, this sensitivity of the wake-up circuit when said carrier frequency of a received RF signal is above said given frequency range or in a second given frequency range higher than this given frequency range.

16. The transponder according to claim 14, wherein said sensitivity control unit, when said carrier frequency of a received RF signal is within a given frequency range and no modulation or preamble is detected in this received RF signal, periodically decreases the sensitivity by a further step after a determined time period which is less than one half a polling-on period defined by said control mechanism controlling activation of said receiver circuit in said listening mode.

17. The transponder according to claim 14, wherein the sensitivity reduction is done stepwise.

18. The transponder according to claim 17, wherein said determined time period is a short period corresponding to a few data bits of a valid RF signal.

19. The transponder according to claim 14, wherein said amplifying unit is formed by a digitally controlled variable gain amplifying unit which is controlled by a sensitivity control circuit of said sensitivity control unit.

20. The transponder according to claim 19, wherein said digitally controlled variable gain amplifying unit is formed by a digitally controlled attenuator and a fixed gain amplifier.

21. The transponder according to claim 19, wherein said digitally controlled variable gain amplifying unit is formed by a digitally controlled variable gain amplifier.

22. The transponder according to claim 14, wherein said receiver circuit further comprises a timeout counter used by the sensitivity control unit to increase again the sensitivity after a defined time period within which this sensitivity, if not at a maximum level, has not been varied in said listening mode.

23. The transponder according to claim 1, wherein the given frequency range is between 115 kHz and 135 kHz.

24. The transponder according to claim 1, wherein the digital modulation or preamble detector does not receive as entry signal a signal coming from the demodulator output.

* * * * *